(12) United States Patent
Hill et al.

(10) Patent No.: US 11,635,577 B2
(45) Date of Patent: Apr. 25, 2023

(54) GASKET FOR A SEALED OPTICAL FIBER TERMINAL

(71) Applicant: Clearfield, Inc., Minneapolis, MN (US)

(72) Inventors: John P. Hill, Oak Grove, MN (US); William J. Cruzen, Monticello, MN (US); David Joseph Johnsen, Plymouth, MN (US); Daniel J. Johnson, Blaine, MN (US); Randy T. VanHorn, Princeton, MN (US); Brian K. Larson, Andover, MN (US); Timothy John Kjolsing, Chaska, MN (US)

(73) Assignee: Clearfield, Inc., Minneapolis, MN (US)

( * ) Notice: Subject to any disclaimer, the term of this patent is extended or adjusted under 35 U.S.C. 154(b) by 0 days.

(21) Appl. No.: 17/144,369

(22) Filed: Jan. 8, 2021

(65) Prior Publication Data
US 2021/0208342 A1 Jul. 8, 2021

Related U.S. Application Data

(60) Provisional application No. 62/958,536, filed on Jan. 8, 2020.

(51) Int. Cl.
*G02B 6/44* (2006.01)
*G02B 6/38* (2006.01)
*G02B 6/255* (2006.01)

(52) U.S. Cl.
CPC .......... *G02B 6/4444* (2013.01); *G02B 6/2558* (2013.01); *G02B 6/3803* (2013.01)

(58) Field of Classification Search
CPC ..... G02B 6/2558; G02B 6/3803; G02B 6/4444
See application file for complete search history.

(56) References Cited

U.S. PATENT DOCUMENTS

| | | | | |
|---|---|---|---|---|
| 4,822,954 A * | 4/1989 | Rebers | ................. | H02G 15/117 174/92 |
| 5,170,017 A * | 12/1992 | Stanevich | ............ | H02G 15/013 174/152 G |
| 6,052,504 A * | 4/2000 | Frohlich | .............. | G02B 6/4442 385/134 |
| 7,780,173 B2 * | 8/2010 | Mullaney | .................. | F16L 5/08 277/621 |
| 8,989,550 B2 * | 3/2015 | Allen | .................... | G02B 6/4444 385/135 |

(Continued)

*Primary Examiner* — Ryan A Lepisto
(74) *Attorney, Agent, or Firm* — Troutman Pepper Hamilton Sanders LLP

(57) ABSTRACT

A sealed terminal has a housing, a splice tray, and a faceplate. The housing has an interior compartment and a first perimeter flange defining an opening into the interior compartment. The splice tray is positioned in the interior compartment and is configured to support a module or a cartridge. The faceplate has a plurality of ports and a second perimeter flange extending at a perimeter edge of the faceplate. The sealed terminal also has at least one connection bracket and a gasket for connecting the housing and the faceplate to each other. The connection bracket has a slot receiving the first perimeter flange and the second flange in an abutting position. The gasket is positioned between the first perimeter flange and the second perimeter flange and configured to seal any gap therebetween.

11 Claims, 30 Drawing Sheets

(56) References Cited

U.S. PATENT DOCUMENTS

| | | | |
|---|---|---|---|
| 9,039,293 B2* | 5/2015 | Hill | G02B 6/3897 |
| | | | 385/77 |
| 9,423,029 B2* | 8/2016 | Coenegracht | H01R 13/508 |
| 9,502,878 B2* | 11/2016 | Coenegracht | G02B 6/4444 |
| 9,513,451 B2* | 12/2016 | Corbille | G02B 6/4452 |
| 9,535,226 B2* | 1/2017 | Simmons | G02B 6/4448 |
| 10,288,829 B2* | 5/2019 | Claessens | G02B 6/4444 |
| 11,125,961 B2* | 9/2021 | Takeuchi | G02B 6/483 |
| 2014/0226935 A1* | 8/2014 | Allen | G02B 6/4444 |
| | | | 385/59 |
| 2017/0131510 A1* | 5/2017 | Janssens | G02B 6/4471 |
| 2020/0081211 A1* | 3/2020 | Ray | G02B 6/4444 |
| 2020/0249407 A1* | 8/2020 | Aznag | G02B 6/4446 |

* cited by examiner

DETAIL B

DETAIL C

GASKET FOR A SEALED OPTICAL FIBER TERMINAL

CROSS REFERENCE TO RELATED APPLICATION

The present application claims benefit of priority under 35 U.S.C. 119(e) to the filing date of U.S. Provisional Patent Application 62/958,536, filed on Jan. 8, 2020, entitled, "Gasket For A Sealed Optical Fiber Terminal," the contents of which are incorporated herein by reference in their entirety.

TECHNICAL FIELD

The present disclosure relates generally to optical fiber communications, and more specifically to gaskets for sealed optical fiber terminals.

BACKGROUND

Data, voice, and other communication networks are increasingly using fiber optics to carry information. In a fiber optic network, each individual fiber is generally connected to both a source and a destination device. Additionally, along the fiber optic run between the source and the destination, various connections or couplings may be made on the optical fiber to adjust the length of the fiber or to provide termination connection ports for end users at which one or more fibers may be branched from a feed cable. In instances when the connection may be exposed to weather conditions, an essentially waterproof configuration of components is needed.

To interconnect the cables, various cable connector designs provide for low insertion loss and stability. Some example connectors may include, but are not limited to, SC, Dual LC, LC, ST and MPO connectors. In most of these designs, ferrules (one in each connector, or one in the connector and one in the apparatus or device), each containing an optical fiber end, are butted together end to end and light travels across the junction.

With the increasing desire for completely optical networks, "fiber to the premises" (FTTP) or "fiber to the home" (FTTH) systems are being developed to provide optical fibers that extend from the source to the site of the end-user. For this purpose, optical connection terminals are needed for interconnection of various lines with drop cables that extend to user locations. Further, there is a need for flexible, customizable fiber distribution systems that may be easily expanded or reconfigured.

Further, due to the general vulnerability of fiber optic components and the harsh environments in which they may be placed, there is a need to ensure that fiber optic terminals are properly and sufficiently sealed. A robust design with sufficient sealing and protection of the fiber optic components helps provide a fiber optic terminal with a long part life. The present disclosure includes components and configurations that address this and other issues related to fiber optic terminals.

SUMMARY

In an exemplary embodiment, the present disclosure discloses a sealed terminal. The sealed terminal includes a housing, a splice tray, and a faceplate. The housing includes an interior compartment and a first perimeter flange defining an opening into the interior compartment. The splice tray is positioned in the interior compartment and is configured to support a module or a cartridge. The faceplate includes a plurality of ports and a second perimeter flange extending at a perimeter edge of the faceplate. The sealed terminal also includes at least one connection bracket and a gasket for connecting the housing and the faceplate to each other. The connection bracket includes a slot receiving the first perimeter flange and the second flange in an abutting position. The gasket is positioned between the first perimeter flange and the second perimeter flange and configured to seal any gap therebetween.

In further aspects, the gasket is attached to a rear surface of the faceplate. The gasket may include a plurality of protrusions that are fit into a plurality of corresponding apertures in the rear surface of the faceplate.

In further aspects, the at least one connection bracket includes a plurality of connection brackets connected to each other. The plurality of connection brackets may each comprise a slot for receiving the first perimeter flange and the second perimeter flange in the abutting position. Each of the plurality of connection brackets may include an L-shape.

In additional aspects, the first perimeter flange and the second perimeter flange may each comprise an angled surface and the slot comprises mating angled sidewalls defining sides of the slot.

In additional aspects, the gasket may include a flat surface and an opposing beveled surface. The gasket may also include a narrow end at the outer perimeter and a wide end at the inner perimeter. The gasket may include a stepped flange at the inner perimeter thereof.

In further aspects, the faceplate may include a ridge that follows a path of the gasket, the ridge configured to mate with the stepped flange of the gasket. The gasket may include an S-shape configured to mate with the rear surface of the faceplate and the ridge on the rear surface of the faceplate.

In an exemplary embodiment, the present disclosure is directed to a gasket for a sealed terminal. The sealed gasket includes a rectangular shape forming a perimeter around an opening. The sealed gasket includes a cross section having a first surface, a second beveled surface, and a stepped flange. The sealed gasket includes additional features for forming a strong attachment and robust seal against another component, such as a faceplate of the sealed terminal.

Additional features and advantages of the invention will be made apparent from the following detailed description of illustrative embodiments that proceeds with reference to the accompanying drawings.

BRIEF DESCRIPTION OF THE FIGURES

The foregoing and other aspects of the present invention are best understood from the following detailed description when read in connection with the accompanying drawings. For the purpose of illustrating the invention, there are shown in the drawings embodiments that are presently preferred, it being understood, however, that the invention is not limited to the specific instrumentalities disclosed. Included in the drawings are the following Figures.

DETAILED DESCRIPTION

Aspects of the present disclosure provide sealed optical fiber terminals. The sealed fiber optic terminal may include a gasket and connection design that provides efficient and robust protection for the components of the terminal within a sealed housing. Disclosed fiber optic terminals may include a housing and faceplate design, with the gasket being present between these components to seal the connection therebetween. Some embodiments further include a sealing plug for sealing one or more openings in the faceplate for receiving drop cables therethrough.

The present disclosure is not limited in terms of the particular embodiments described in this application, which are intended as illustrations of various aspects. Many modifications and variations can be made without departing from its spirit and scope, as will be apparent to those skilled in the art. For example, the gasket and associated components may be applied to other terminal designs, such as between mating housings, a housing and a cover, a movable door and a housing, etc.

Figure 1:
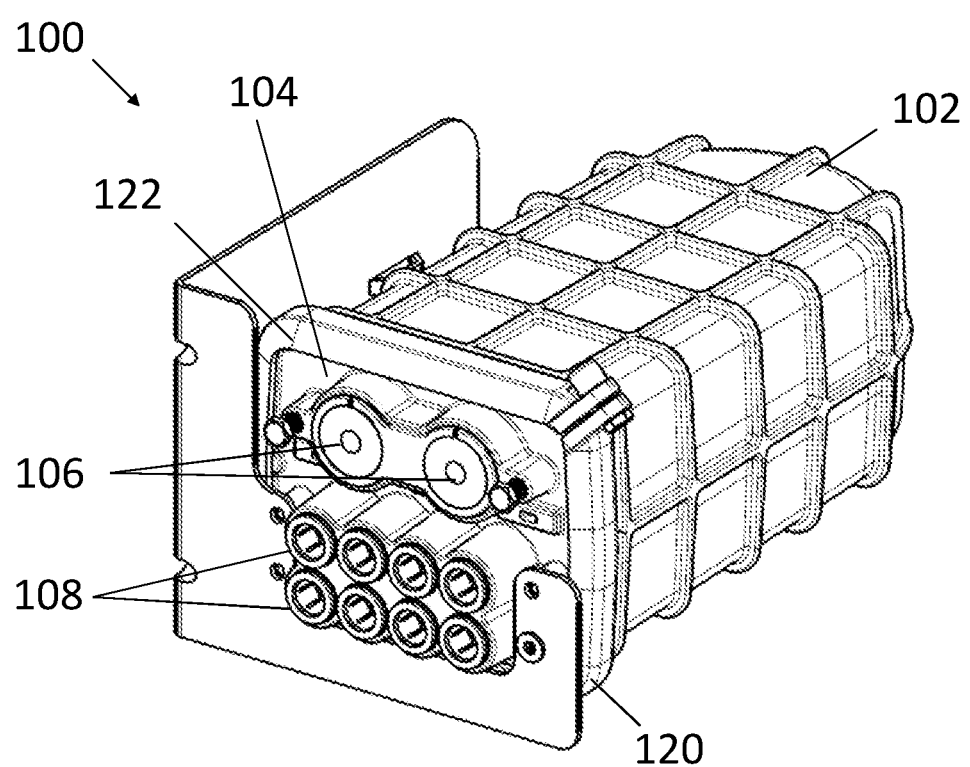
FIG. 1 is a front perspective view of one embodiment of a terminal, according to aspects of the present disclosure.

FIG. 1 is a perspective view of one embodiment of a terminal 100. The terminal 100 includes a housing 102 and a faceplate 104 configured to couple to the housing 102 of the terminal. The faceplate 104 may include a plurality of ports, including incoming cable ports 106 and distribution ports 108. The incoming cable ports 106 may be configured to connect to a round cable, flat drop cable, or other type of cable. The distribution ports 108 may be configured to connect to connectors, such as Clearfield Flex Connectors.

In the illustrated embodiment, the terminal 100 includes two incoming cable ports 106 and eight distribution ports 108, although other embodiments may include a different number of each type of port. In one example, each incoming cable port 106 may be a sealed port, and each distribution port 108 may be a sealed port. Each distribution port 108 may have a breakoff cap. In some embodiments, the distribution ports 108 may have anti-rotation locking features. The distribution ports 108 may be Clearfield FlexPorts. The ports 106 and 108 may include knock-out covers that can be removed once a port 106 or 108 is used. The ports 106 and/or 108 may also be arranged in a different configuration than the embodiment shown in FIG. 1.

The terminal 100 further comprises a pair of connection brackets 120, 122 configured to secure the housing 102 to the faceplate 104. The connection brackets 120, 122 may include an L-shape and secure a perimeter of the housing 102 to the faceplate 104. In other embodiments, the connection brackets 120, 122 may include different shapes and configurations. For example, the connection brackets 120, 122 may comprise a U-shape.

Figure 2A:
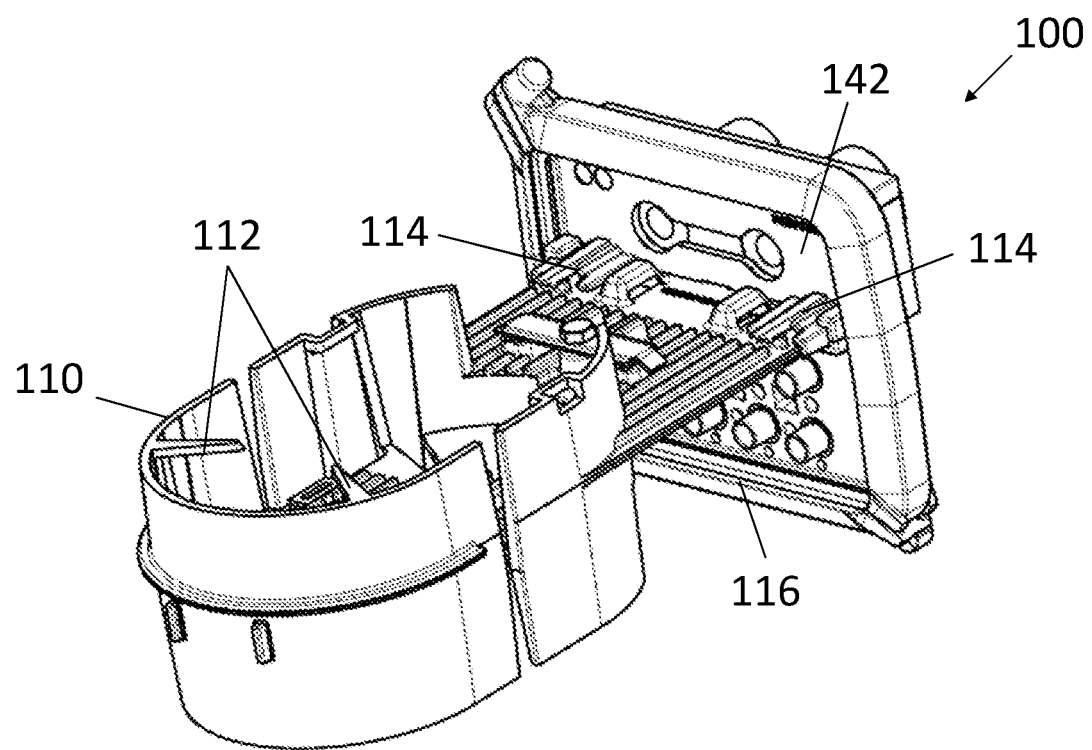
FIG. 2A is a rear perspective view of the terminal with the housing removed, according to aspects of the present disclosure.
Figure 2B:
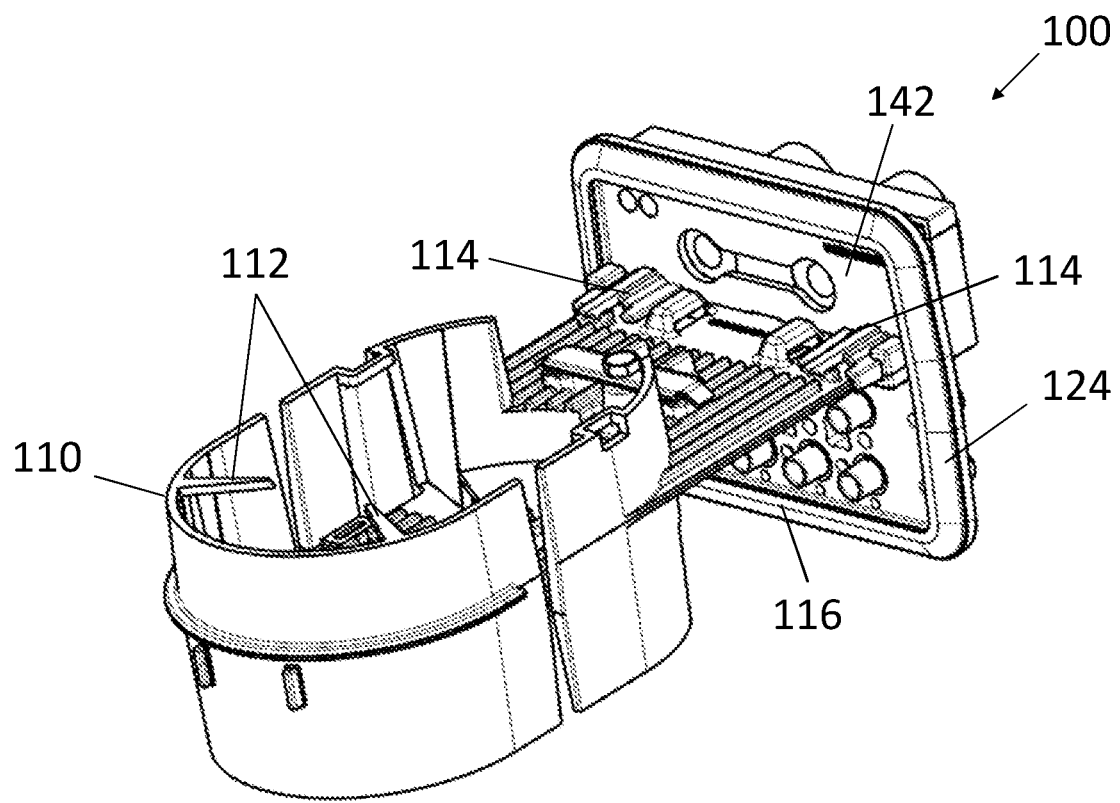
FIG. 2B is another rear perspective view of the terminal, with the housing and connector brackets removed, according to aspects of the present disclosure.

FIGS. 2A-B is a rear perspective view of the terminal 100, with the housing 102 removed, showing elements that would be housed in an interior compartment of the housing 102 behind the faceplate 104. The terminal 100 may further include at least one fiber splice tray 110. The fiber splice tray 110 may support a module or cassette (not shown) having a splice and fiber management area. The module or cassette may be configured to terminate the fiber that runs into the terminal 100. Various embodiments may include different types or configurations of modules or cassettes. In various embodiments, the fiber splice tray 110 may provide slack storage. The fiber splice tray 110 may comprise a plurality of prongs 112 for fiber management and storage. The fiber splice tray 110 may further support an adapter plate having adapters that correspond to the distribution ports 108.

FIGS. 2A-2B further depict a connection between the fiber splice tray 110 and the faceplate 104. A rear side of the faceplate 104 includes one or more connecting protrusions 114 that interact with a connecting element 116 of the fiber splice tray 110. For example, the connecting protrusions 114 and connecting element 116 may use a tab and aperture connection, although other connections are possible.

In FIG. 2A, the connection brackets 120, 122 are shown in place surrounding a perimeter of the faceplate 104. The connection brackets 120, 122 may include angled bolt connections 118. In FIG. 2B, the connection brackets 120, 122 are removed, exposing a gasket 124 that is configured to seal the connection between the housing 102 and the faceplate 104.

Figure 3A:
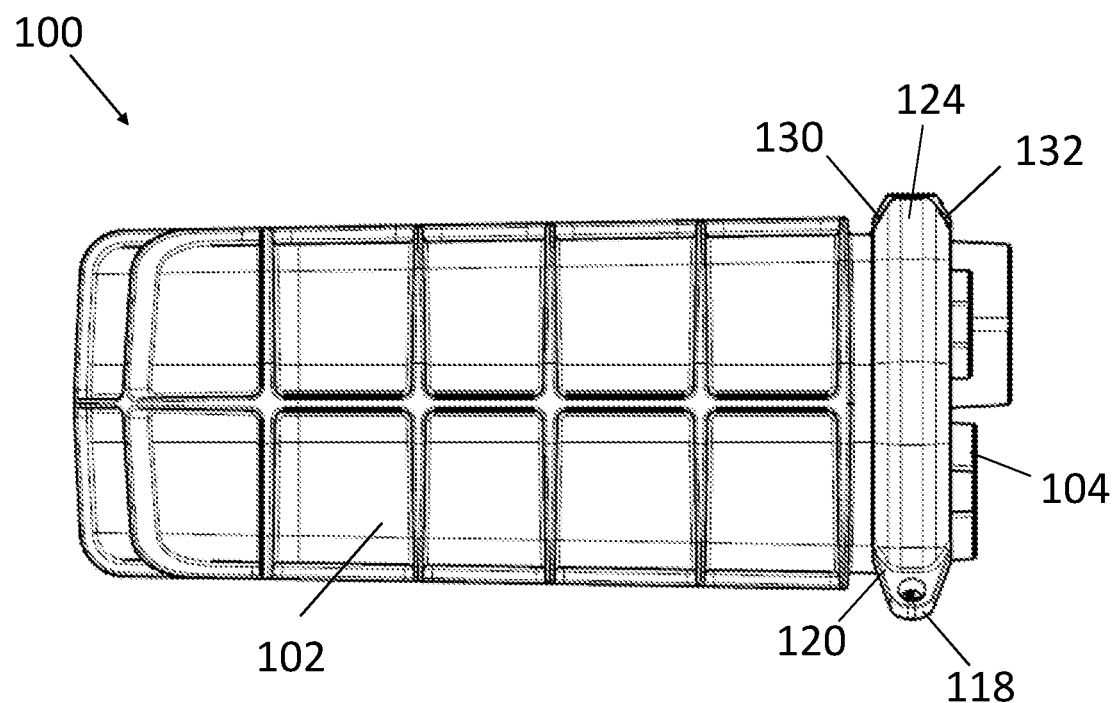
FIG. 3A is a side view of the terminal, illustrating features of a connection between the housing and a faceplate, according to aspects of the present disclosure.
Figure 3B:
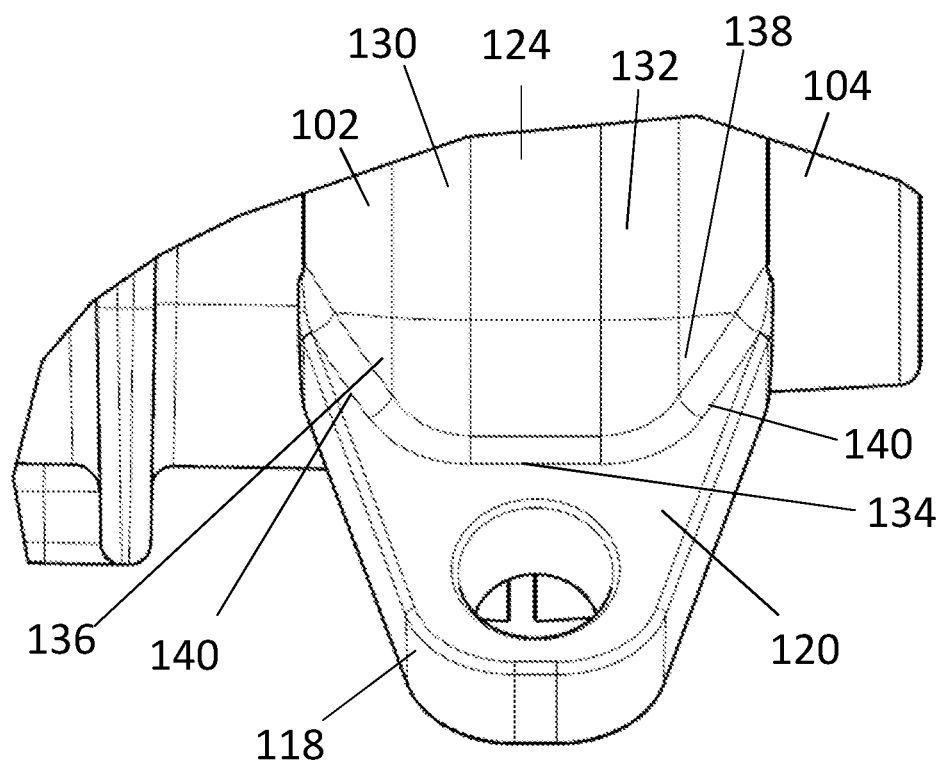
FIG. 3B is a close-up view of the connection shown in FIG. 3A, according to aspects of the present disclosure.

FIGS. 3A-3B show a side view of the terminal 100, including the connection between the housing 102 and the faceplate 104, with the connection bracket 122 removed and the connection bracket 120 in place. In an exemplary embodiment, the housing 102 includes a perimeter flange 130 and the faceplate 104 also includes a corresponding perimeter flange 132. The perimeter flanges 130, 132 are configured to interface with each other with the gasket 124 sealing a gap, if any, therebetween. The connection bracket 120 comprises a slot 134 configured to receive the interfacing perimeter flanges 130, 132. The connection bracket 122 includes a similar configuration to connection bracket 120. Together, the connection brackets 120, 122 surround the perimeter flanges 130, 132 and are secured to each other to connect the housing 102 to the faceplate 104.

As shown in FIGS. 3A-3B, each perimeter flange 130, 132 may include an angled surface 136, 138, respectively. The connection bracket 120 may include angled sidewalls 140 defining the slot 134 that mate with the angled surfaces 136, 138. The angled surfaces 136, 138, and sidewalls 140 may enable ease of insertion of the connection brackets 120, among other advantages, such as drawing the housing 102 and the faceplate 104 towards each other.

Embodiments of terminals disclosed herein, such as terminal 100, may be used in optical fiber distribution systems. For example, an incoming cable port of terminal 100 may be configured to receive an incoming cable having a plurality of fibers into the terminal. The terminal may be configured to allow connecting the fibers to a cassette, module or adapters within the terminal. Drop cables may be supplied to user locations through one or more distribution ports. Various user locations may be equipped with tap boxes configured to receive one or more fibers and to connect them to the user locations.

Figure 4A:
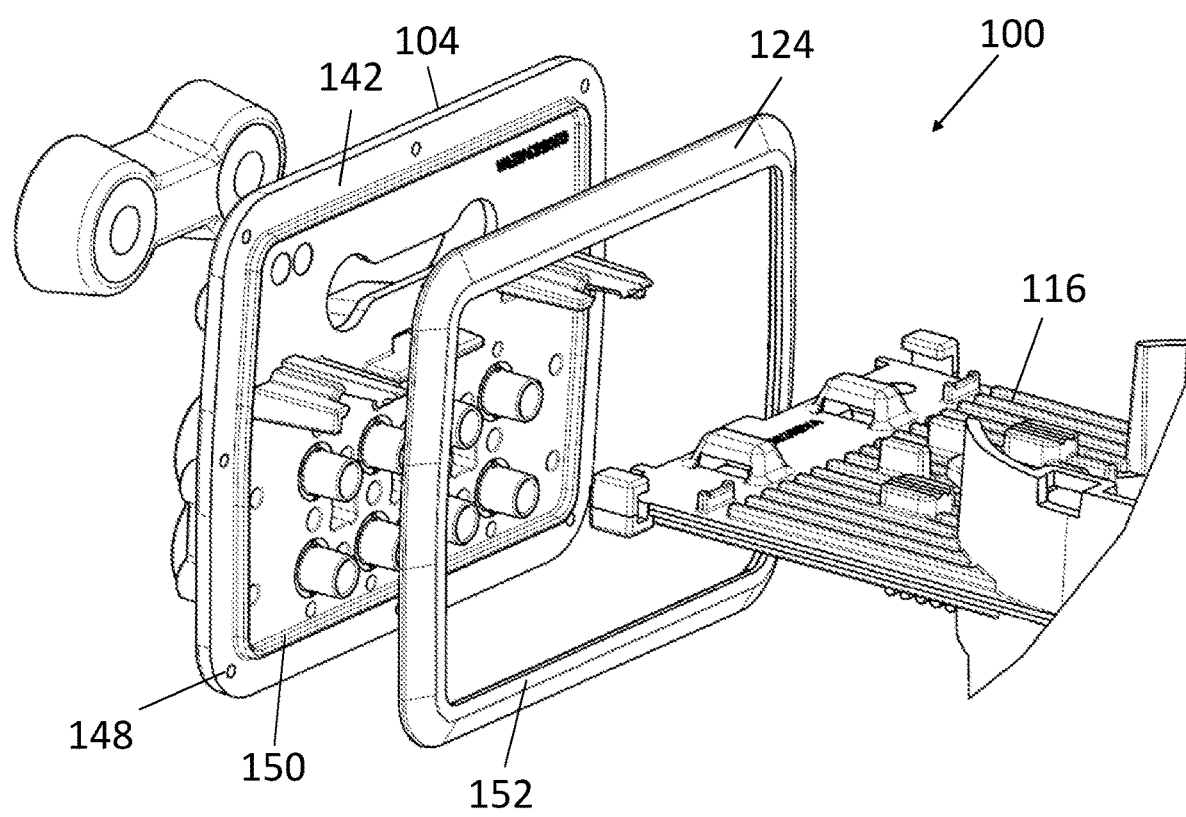
FIG. 4A is an exploded view of a portion of the terminal, according to aspects of the present disclosure.
Figure 4B:
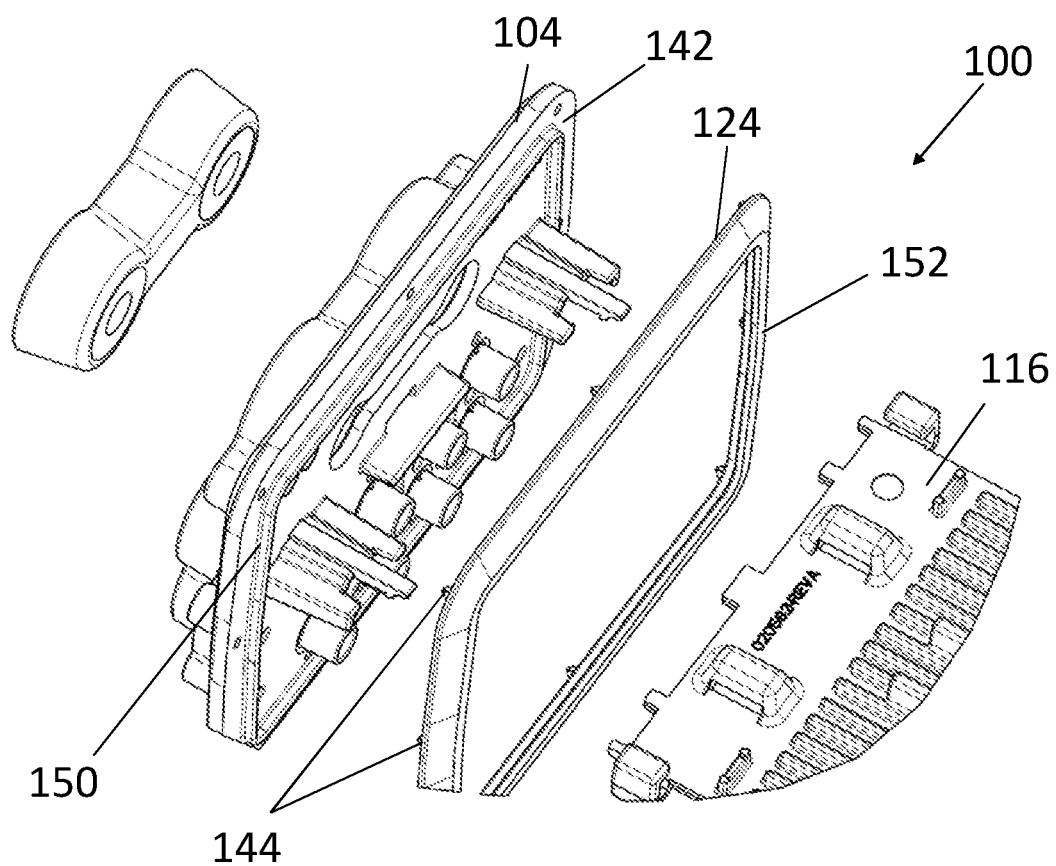
FIG. 4B is another exploded view of a portion of the terminal, according to aspects of the present disclosure.

FIGS. 4A-4B are exploded views of a portion of the terminal 100. In an exemplary embodiment, the gasket 124 is configured to be connected to a rear surface 142 of the faceplate 104. The gasket 124 may be comprised of silicone or other flexible material, for example.

Figure 5A:
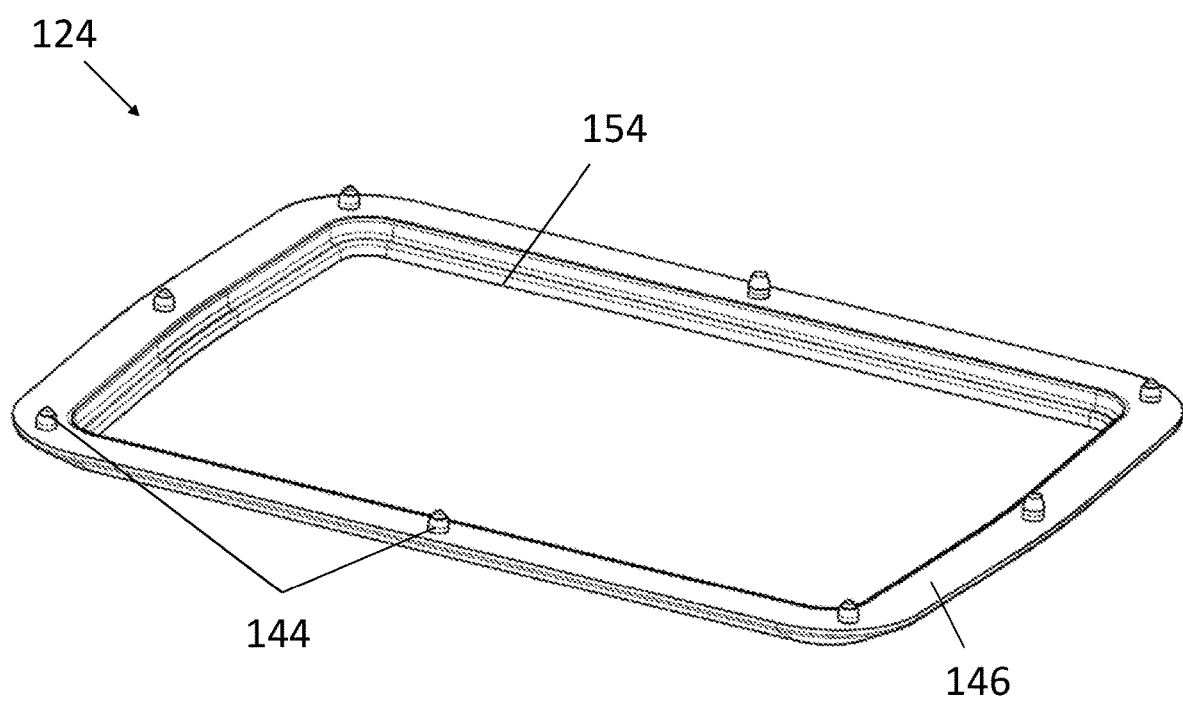
FIG. 5A is a perspective view of a first embodiment of a gasket used in conjunction with the terminal of FIG. 1, according to aspects of the present disclosure.

FIG. 5A is a perspective view of the gasket 124, according to a first embodiment. The gasket 124 may include a plurality of protrusions 144 extending from a first surface 146 of the gasket. The first surface 146 may be a generally flat surface configured to abut a flat portion of the rear surface 142 of the faceplate 104. The protrusions 144 may be configured to be inserted into corresponding apertures 148 formed in the rear surface 142 of the faceplate 104. The rear surface 142 of the faceplate 104 may include a ridge 150 that follows the path of the gasket 124 and creates an additional sealing surface against which the gasket 124 may abut.

A second surface 152 of the gasket 124, opposite the first surface 146, may be beveled to provide a narrow end at the outer perimeter and a wide end at the inner perimeter of the gasket 124. The gasket 124 may further comprise a stepped flange 154 at the inner perimeter. The stepped flange 154 creates an additional sealing surface configured to mate with the ridge 150 of the faceplate 104.

Figure 5B:
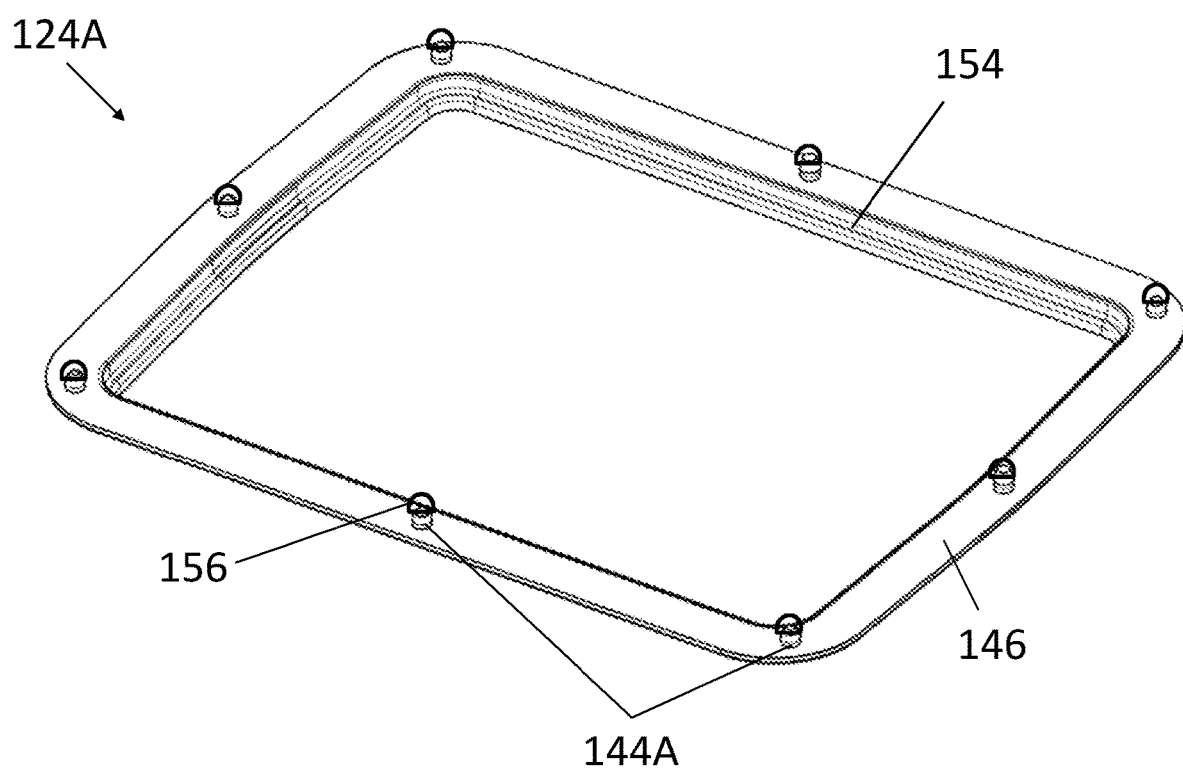
FIG. 5B is a perspective view of a second embodiment of a gasket used in conjunction with the terminal of FIG. 1, according to aspects of the present disclosure.

FIG. 5B is a perspective view of the gasket 124, according to a second embodiment (referred to hereinafter as gasket 124A). The protrusions 144A include an enlarged end 156 configured to allow for a press-fit of the protrusions 144A into the corresponding apertures 148.

Figure 6A:
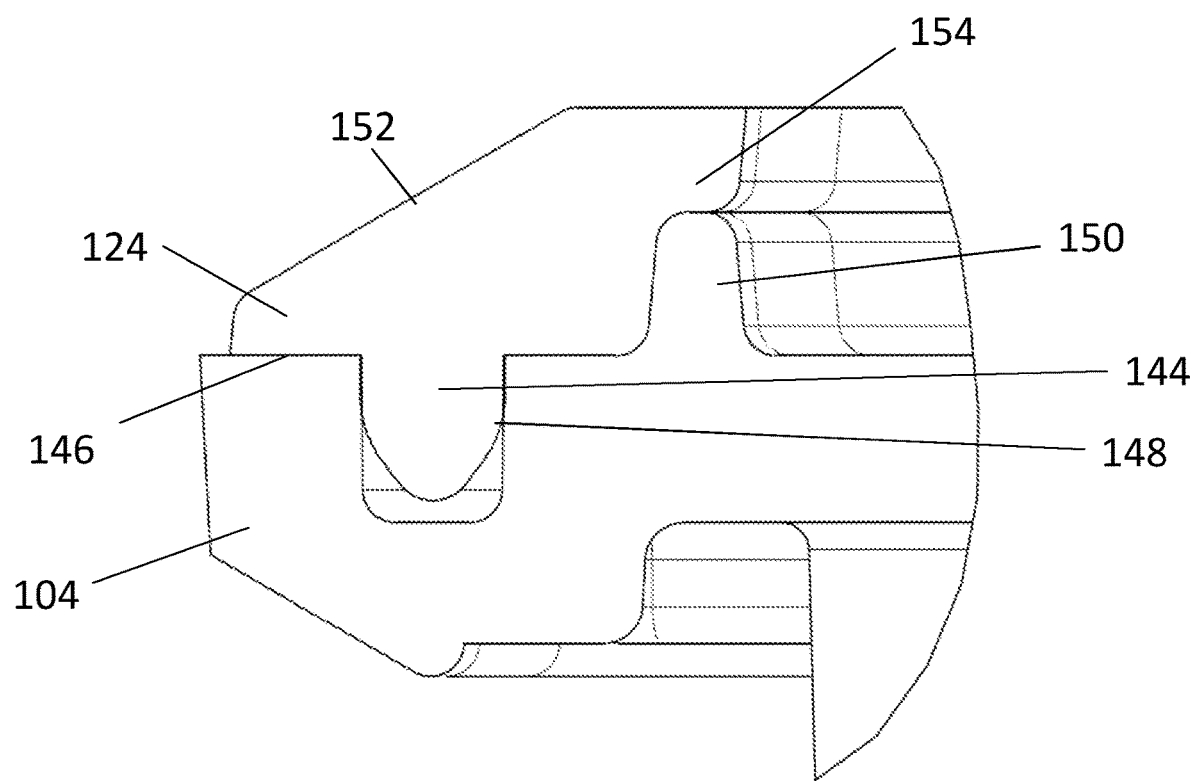
FIG. 6A is a close-up view of an embodiment of a connection between the gasket of FIG. 5A and the faceplate of the terminal, according to aspects of the present disclosure.

FIG. 6A is a cross-sectional view of a connection between the faceplate 104 and the gasket 124. An S-shape of the gasket 124 may provide multiple abutting surfaces the provide a more robust sealing arrangement that helps to further inhibit debris and material from entering any gap between the housing 102 and the faceplate 104. The protrusions 144 compress inside of the apertures 148 to produce a strong attachment between the gasket 124 and the faceplate 104.

Figure 6B:
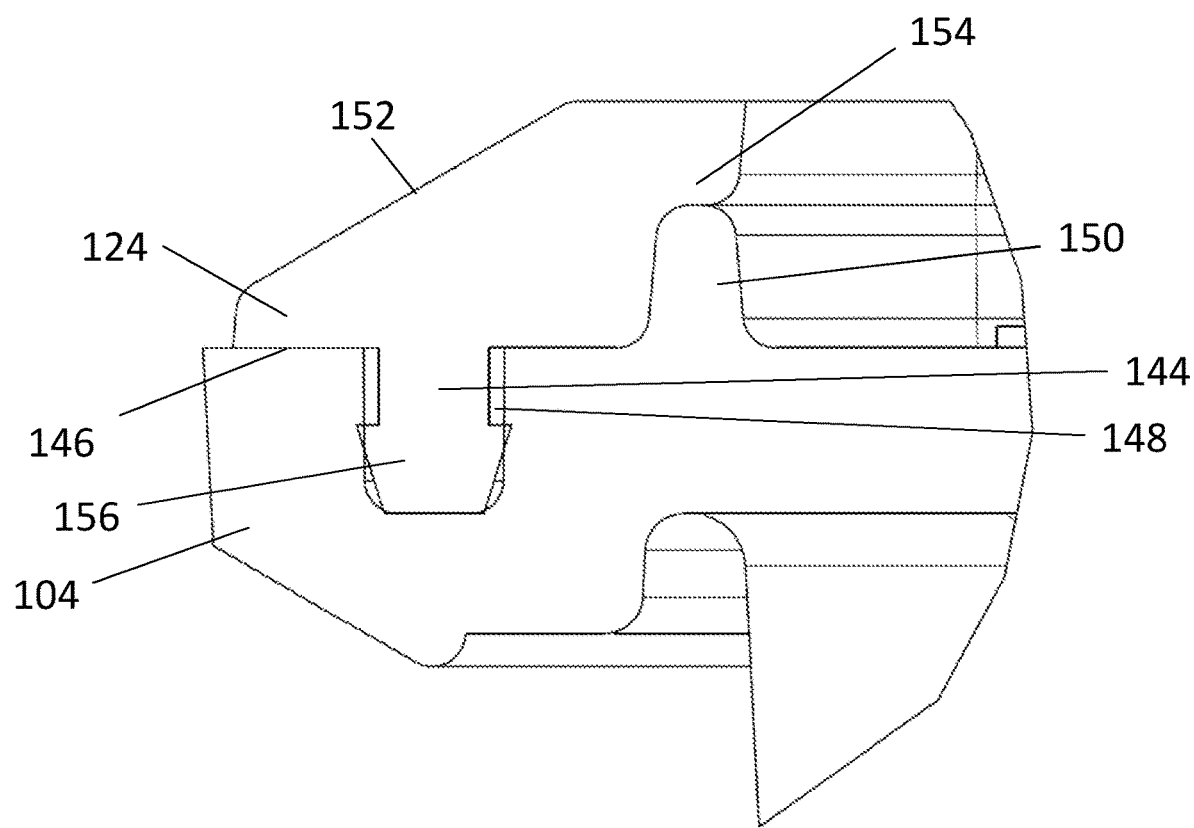
FIG. 6B is a close-up view of an embodiment of a connection between the gasket of FIG. 5B and the faceplate of the terminal, according to aspects of the present disclosure.

FIG. 6B is a cross-sectional view of a connection between the faceplate 104 and the gasket 124A. The enlarged ends 156 of the protrusions 144A are press-fit into the apertures 148 to retain the gasket 124A firmly to the faceplate 104.

Figure 7A:
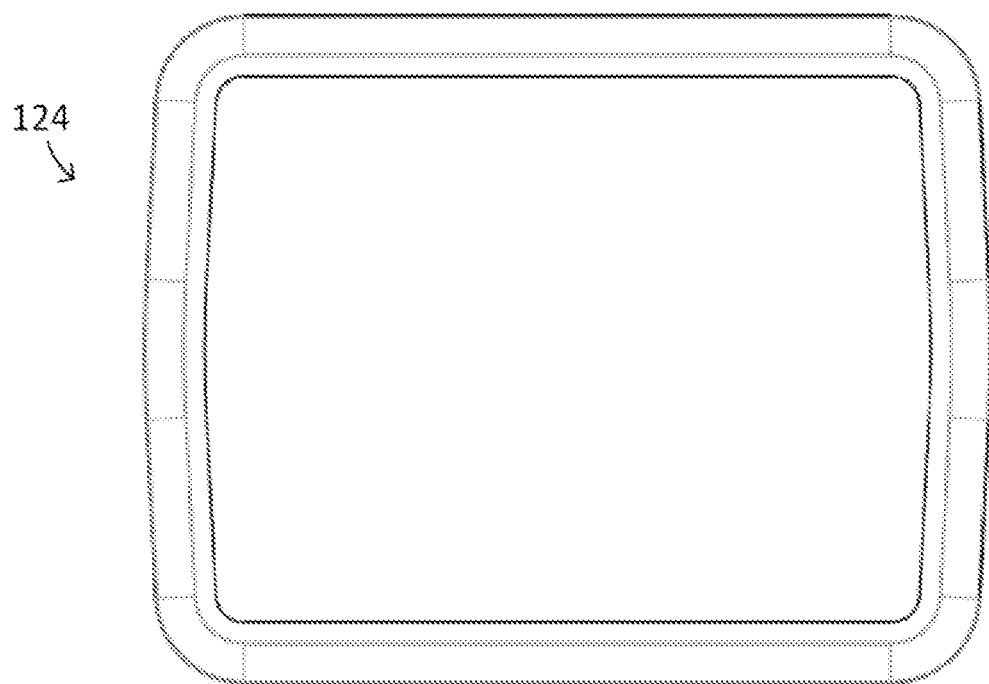
FIGS. 7A-G are additional views of the gasket of FIG. 5A.
Figure 7B:
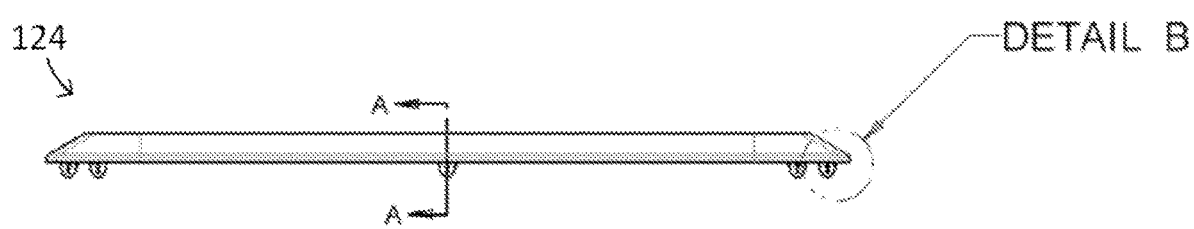
Figure 7C:
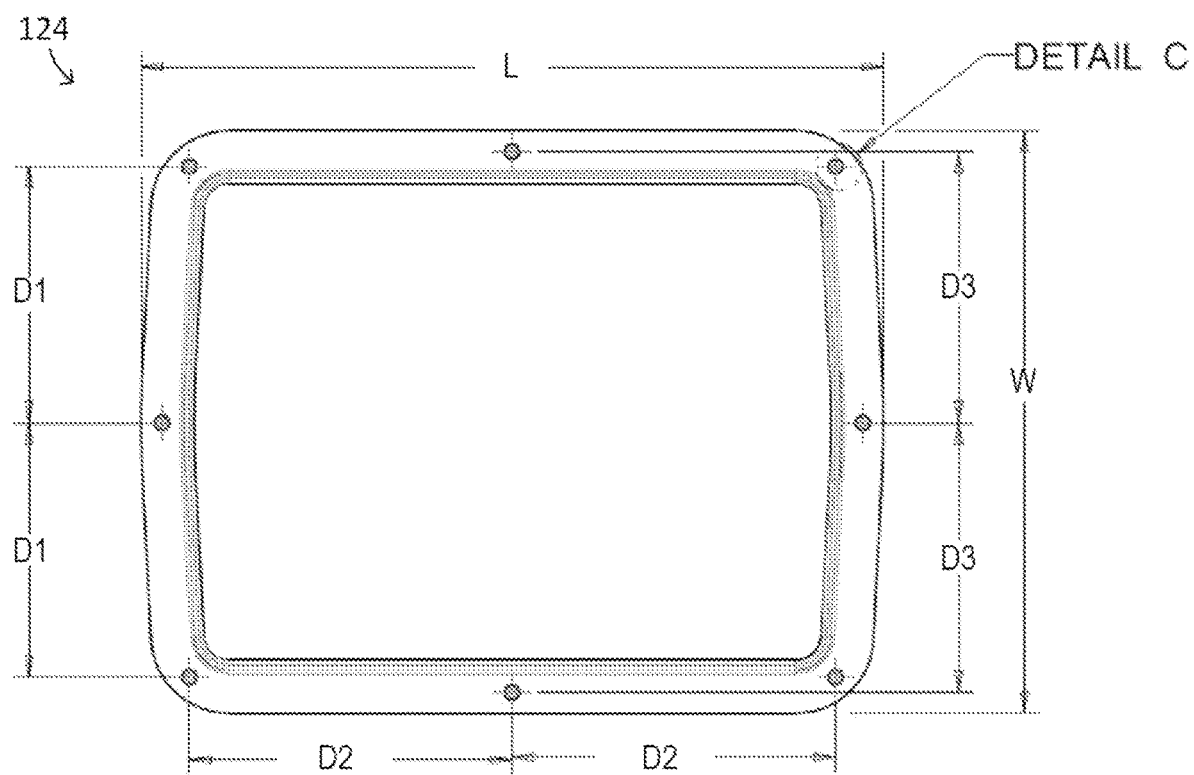
Figure 7D:
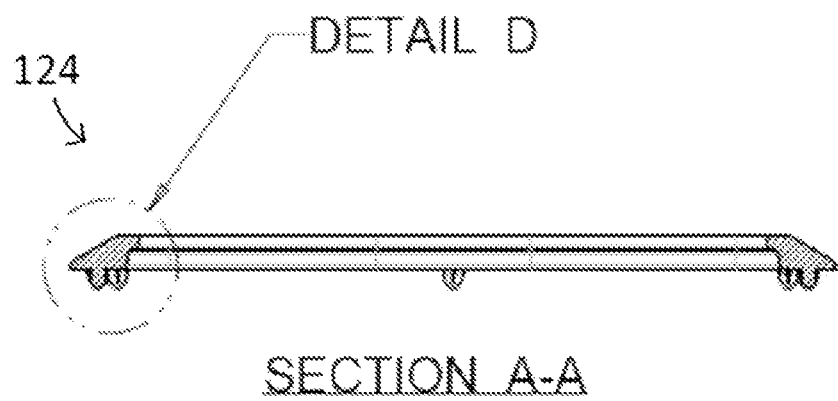

FIGS. 7A-G are additional views of the gasket 124. FIG. 7A is a front view of the gasket 124, including the beveled second surface 152. FIG. 7B is a side view of the gasket 124. As shown, the beveled second surface 152 slopes away from a center of the gasket 124. FIG. 7D is a cross-sectional view of the gasket 124, taken at line A-A of FIG. 7B.

FIG. 7C is a rear view of the gasket 124, including the first surface 146. The first surface 146 includes the protrusions 144 spaced around the first surface 146 and projecting in the plane of the page. In an exemplary embodiment, the gasket 124 includes eight protrusions, four at each of the corners of a rectangular shape, and four at the centers of each side of the rectangular shape. FIG. 7C further includes exemplary dimensions of the gasket 124, which are provided for example only and should not be considered limiting. For example, the gasket 124 may include a length L of approximately 6.5 in., a width W of approximately 5 in., a distance D1 from corner to center protrusion along short side of approximately 2.25 in., a distance D2 from corner to center protrusion along long side of approximately 2.8 in., and a distance D3 from center protrusion along short side to center protrusion along short side of approximately 2.4 in. These exemplary dimensions produce a generally rectangular shape of the gasket 124, although it should be understood that in other embodiments, the gasket 124 may have other shapes (e.g., square, circular, triangular, etc.)

Figure 7E:
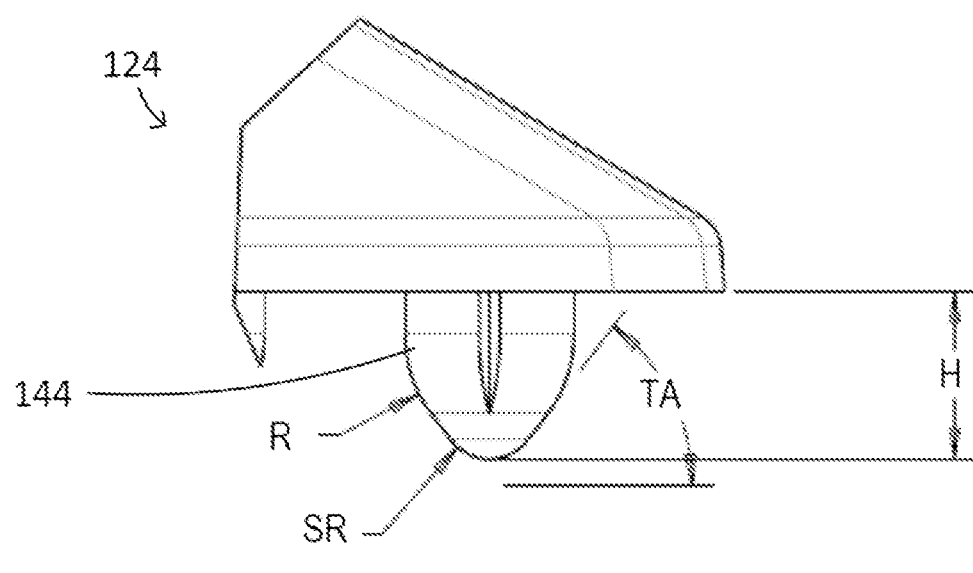

FIG. 7E is a close-up view of a side view of a protrusion 144, taken at detail B of FIG. 7B. The protrusion 144 may include one or more side slits 158 which enable compression of the protrusion 144 when pressed into a corresponding aperture 148. The side slits 158 may be removal of material at the outer circumference to enable compression of the protrusion 144. FIG. 7E further includes exemplary dimensions of the protrusion 144, including a height H of approximately 0.3-0.5 in., a radius R of approximately 0.1 in. at a base of the protrusion, a transition angle TA of approximately 50-55 degrees sloping into a spherical end portion, the spherical end portion of a spherical radius SR of approximately 0.03-0.05 in.

Figure 7F:
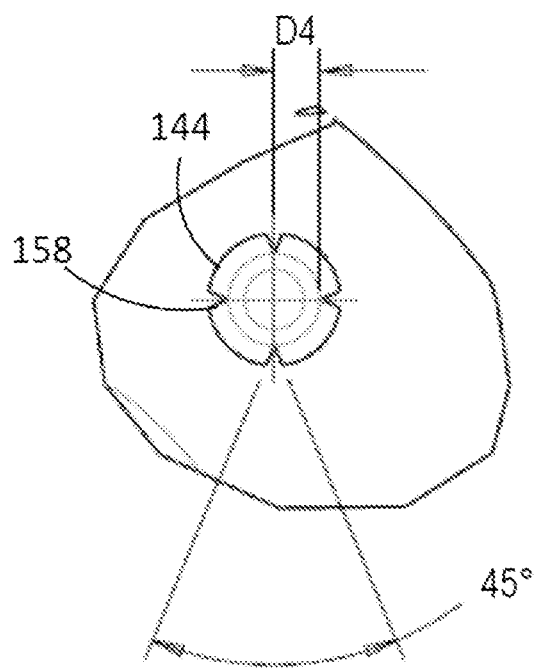

FIG. 7F is a close-up view of a front view of a protrusion 144, taken at detail C of FIG. 7C. As shown, the protrusion 144 may in an exemplary embodiment include four side slits 158. The side slits may be formed as 45 degree angled slits that include a depth that is approximately a distance D4 from the center of the protrusion, the distance D4 being approximately 0.046 in. in an embodiment.

Figure 7G:
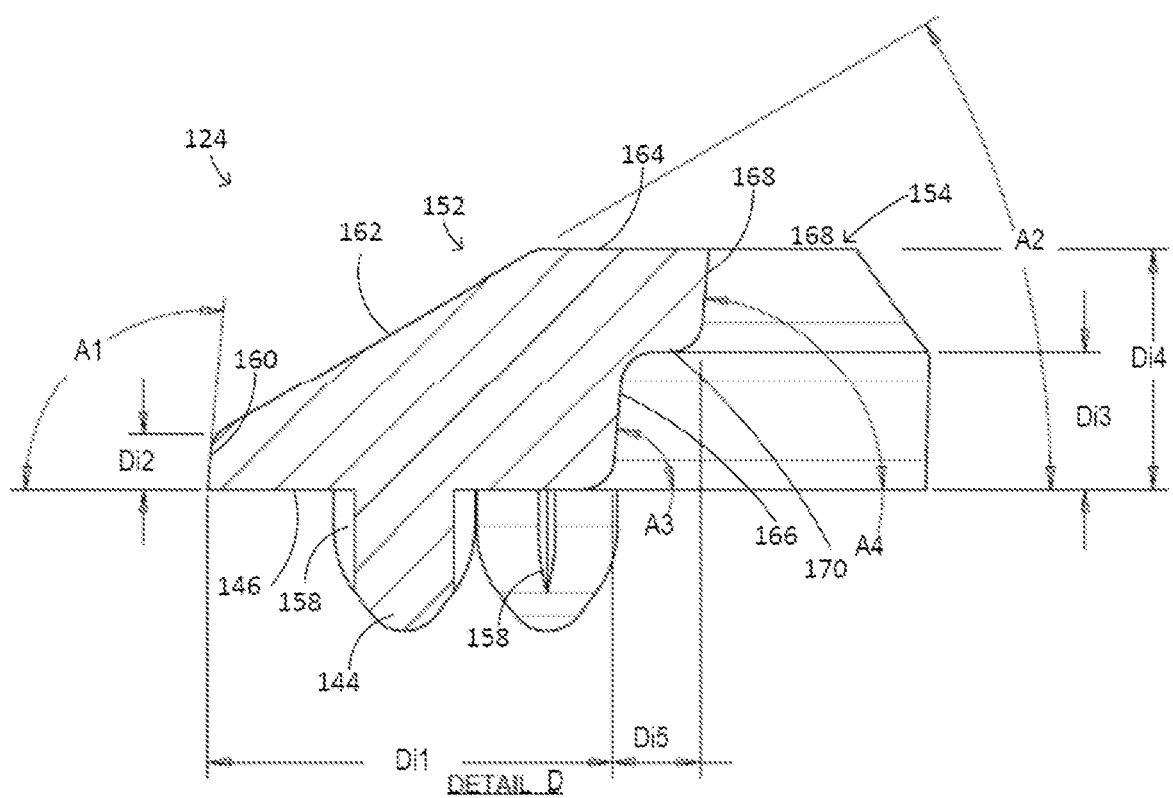

FIG. 7G is a close-up view of a cross-sectional portion of the gasket 124, taken at detail D of FIG. 7D, and further shows additional aspects of the gasket 124, including a shape of the first surface 146, the beveled second surface 152, and the stepped flange 154. FIG. 7G also includes exemplary dimensions of the gasket 124. In an exemplary embodiment, the first surface 146 includes a dimension Di1 of approximately 0.375 in. The beveled second surface 152 includes an outer edge 160 having a dimension Di2 of approximately 0.05 in. and extending at an angle A1 of approximately 95 degrees with respect to the first surface 146. A sloped surface 162 extends from the outer edge 160 to an upper shelf 164 at an angle A2 of approximately 30 degrees with respect to the first surface 146. The S-shape of the stepped flange 154 results in a first segment 166 connected to a second segment 168 by a step 170. The first segment 166 may have a dimension Di3 of approximately 0.13 in while the combination of the first and second segments 166, 168 may have a dimension Di4 of approximately 0.225 in. Each of the first and second segments 166, 168 may extend parallel to the outer edge 160, such as at angles A3 and A4 of 85 degrees with respect to the first surface 146. The step 170 that separates the first and second segments may include a dimension Di5 of approximately 0.08 in., and may run parallel to the first surface 146.

Figure 8A:
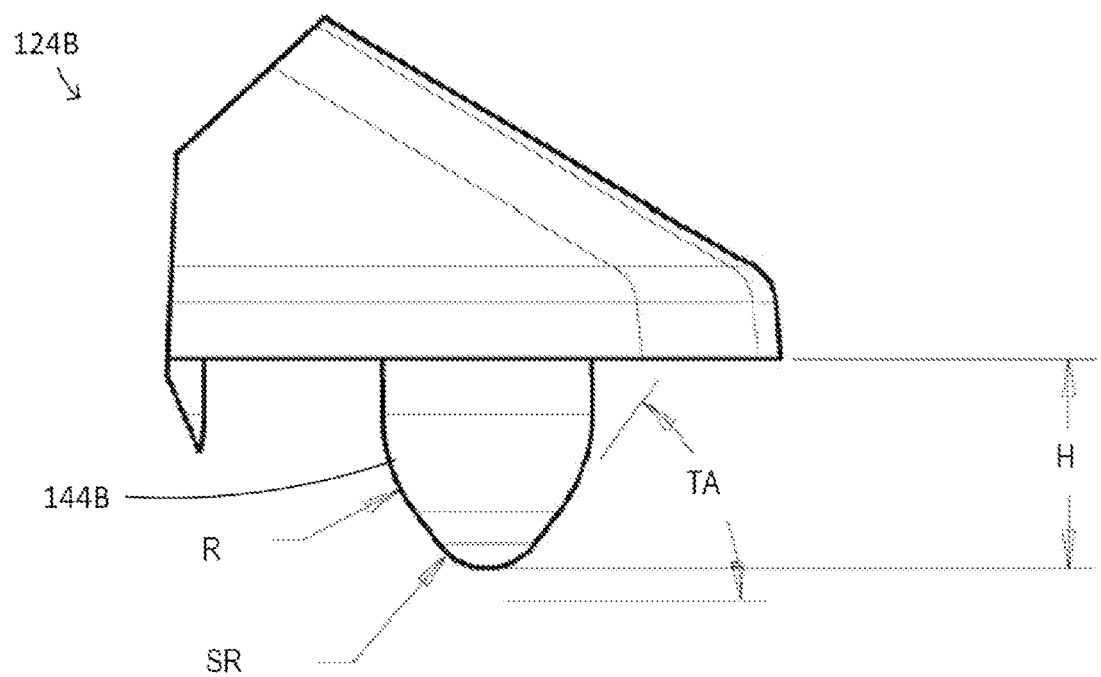
FIGS. 8A-C are additional views of a third embodiment of a gasket, according to aspects of the present disclosure.
Figure 8B:
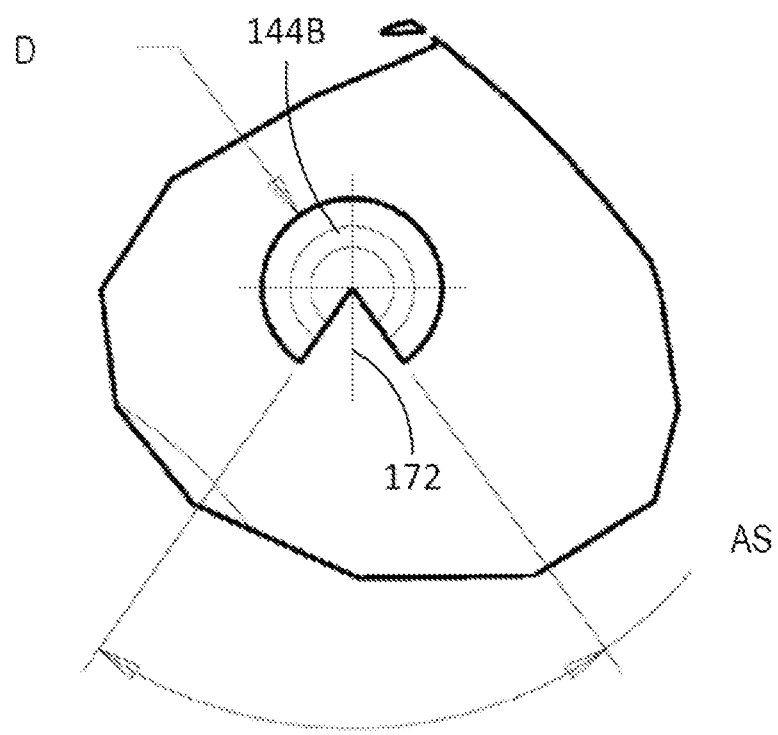
Figure 8C:
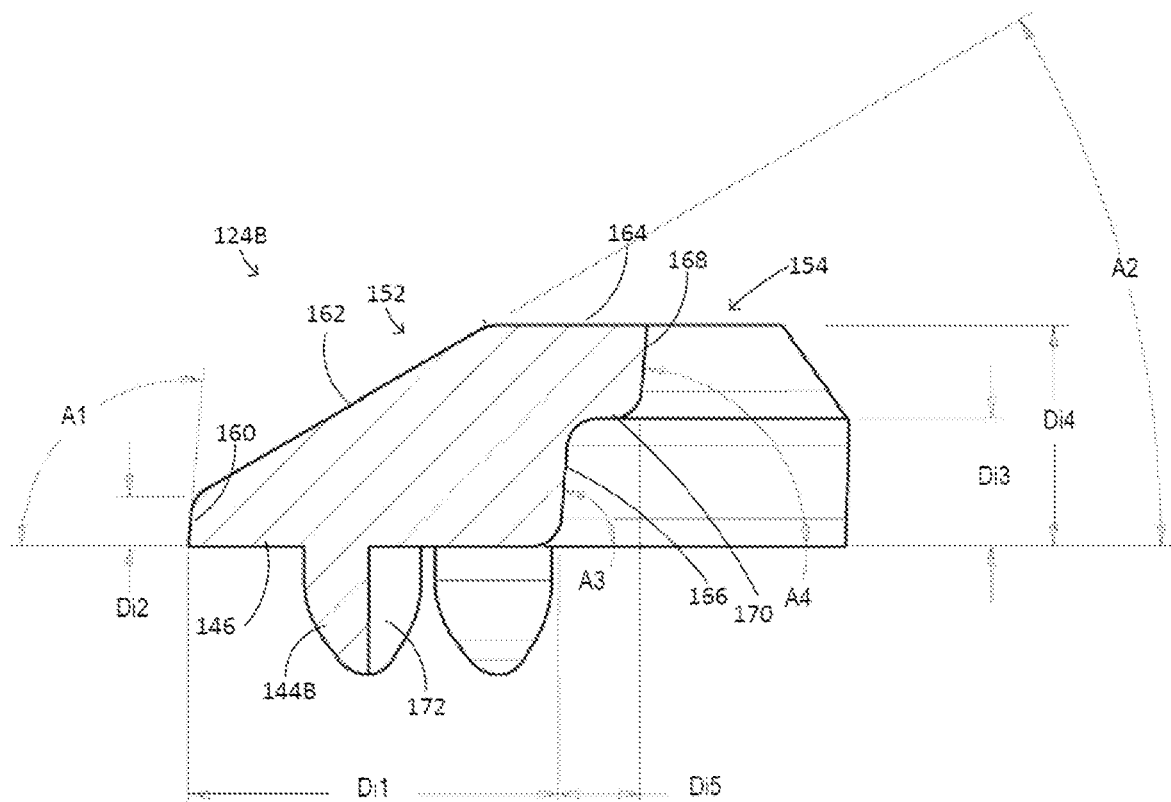

The protrusions 144 and 144A are exemplary and other embodiments are possible to provide a strong attachment feature. FIGS. 8A-8C illustrate another embodiment of a gasket 124B including protrusions 144B. Protrusions 144B are similar to protrusions 144A in shape and may include the same or similar dimensions. Whereas the protrusions 144 may include side-slits in order to enable compression, the protrusions 144B may be solid except include an angular "slice" taken out of the circumference. FIG. 8A illustrates that the protrusion 144B appears from at least one angle as complete circle. However, the top-down view of FIG. 8B shows that an angular section 172 is cut out of the circumference. The angular section 172 may include, for example, an angle AS of approximately 70 degrees of the circumference, although other angles are possible. The base of the protrusion 144B may include a diameter D of approximately 0.1-0.15 in. The angular section 172 enables compression of the protrusion 144B into the aperture 148 such that a press-fit is created. FIG. 8C further illustrates a cross sectional detail showing the protrusion 144B, including the angular section 172 cut out.

Consistent with disclosed embodiments, the terminal 100 may be manufactured with the housing 102 connected to the faceplate 104. This may be accomplished by attaching the gasket 124 to the rear surface 142 of the faceplate 104. The connection brackets 120, 122 may then be connected to each other surrounding the perimeter flanges 130, 132 of the housing 102 and faceplate 104. The gasket 124 may be compressed between the perimeter flanges 130, 132 and thereby seal any gap formed between the housing 102 and the faceplate 104. The gasket 124 may include protrusions 144, 144A, or 144B that include a unique shape for create a strong attachment through a compression fit of the gasket material into a corresponding aperture. The terminal 100 may thus be a sealed terminal that, in combination with the sealed ports 106, 108, may be effectively sealed against environmental elements that may otherwise enter the housing 102 and cause damage to the components.

Figure 9:
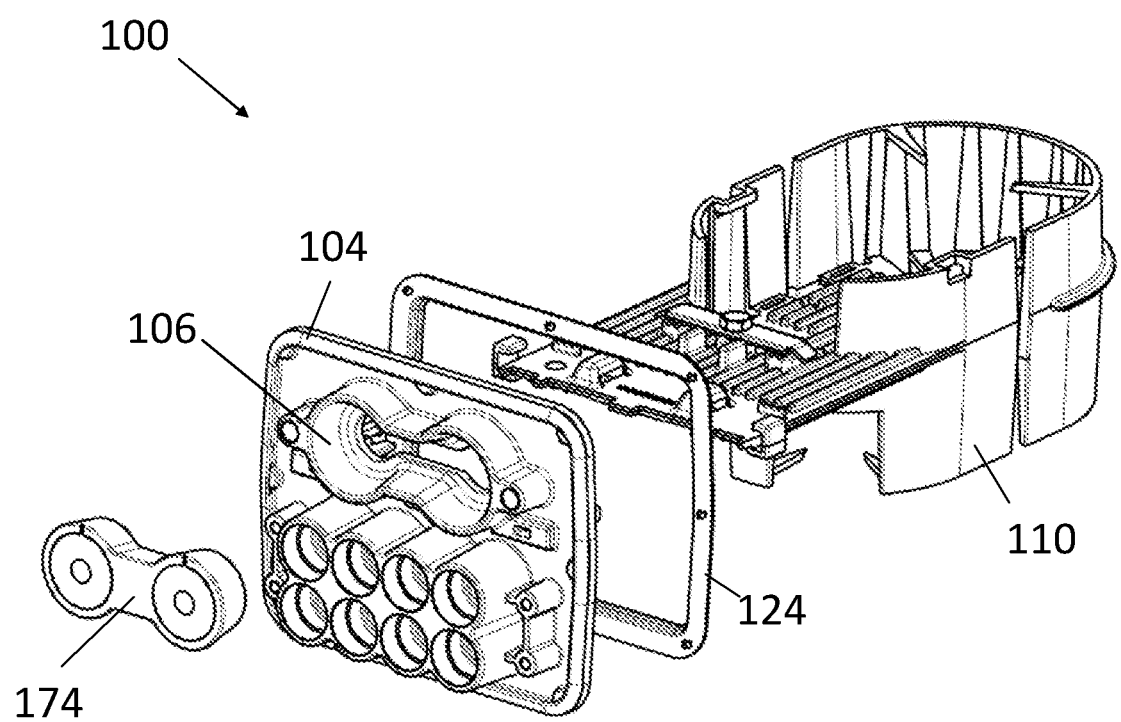
FIG. 9 is an exploded view of selected components of the terminal, according to additional aspects of the present disclosure.

The gasket 124, as described herein, provides edge sealing to the faceplate 104. In some embodiments, additional sealing elements may be included to further seal elements of the terminal 100, including additional features of the faceplate 104. For instance, FIG. 9 is an exploded view of components of the terminal 100, including the faceplate 104, fiber splice tray 110, gasket 124, and a sealing plug 174 for sealing the incoming cable ports 106 of the faceplate 104.

Figure 10:
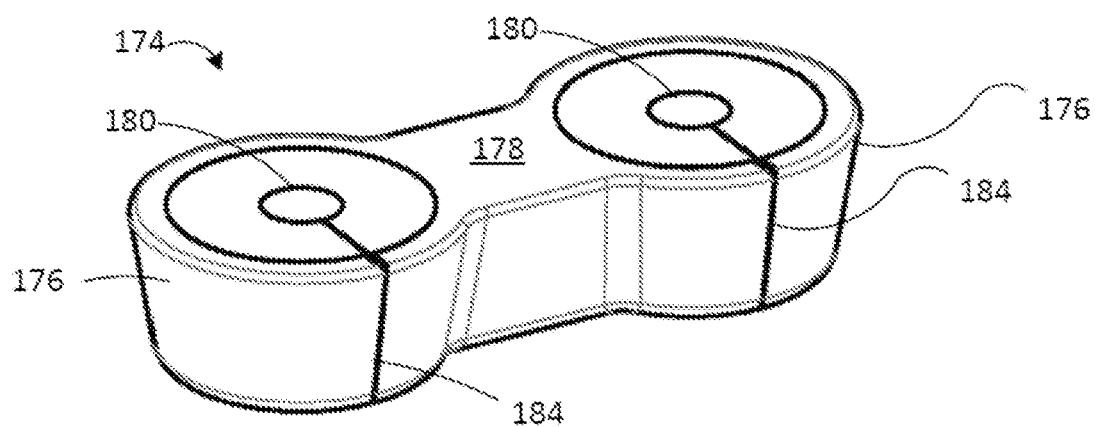
FIG. 10 is a perspective view of a sealing plug, according to aspects of the present disclosure.

FIG. 10 is a perspective view of the sealing plug 174. The sealing plug 174, in an embodiment, includes a shape to fit two circular openings connected by a space, such as by having a two rounded end portions 176 connected by a center portion 178. However, it should be understood that the sealing plug 174 may have other shapes to fit openings of other shapes. The sides of the sealing plug 174 may be slightly sloped and/or conical in order to assist insertion into a corresponding opening in the faceplate 104.

In an exemplary embodiment, the rounded end portions 176 include a hole 180 for receiving a cable 182. The rounded end portions 176 may include a slit 184 for allowing the cable 182 to pass into the hole 180 (e.g., instead of threading the cable 182 through the hole 180). The slit 184 may be created, for example, through manual use of a blade cutting into the material of the sealing plug 174.

Figure 11A:
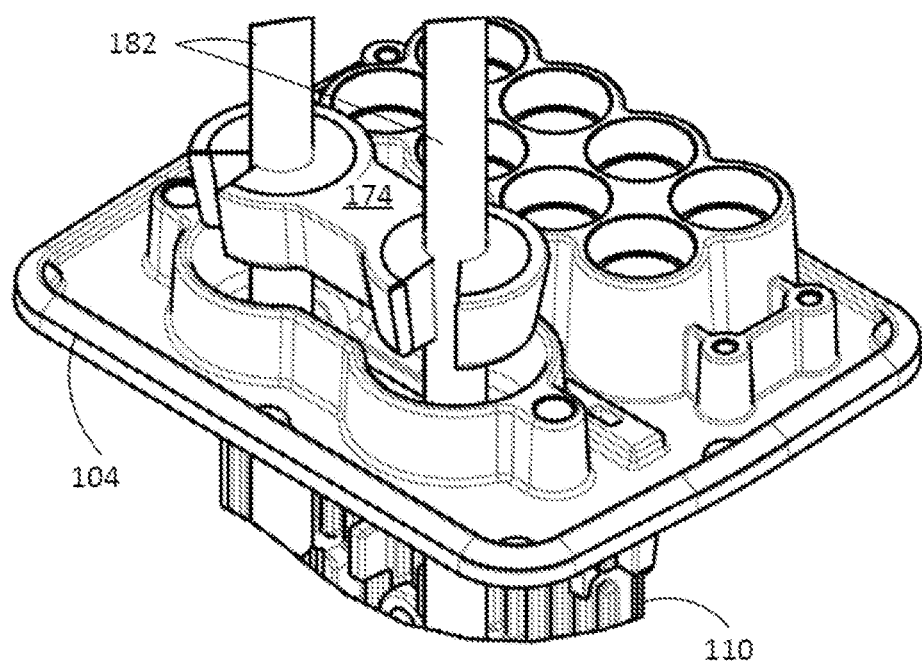
FIGS. 11A-11E are perspective views at progressive steps of a front sealing operation of the faceplate of the terminal, according to aspects of the present disclosure.
Figure 11B:
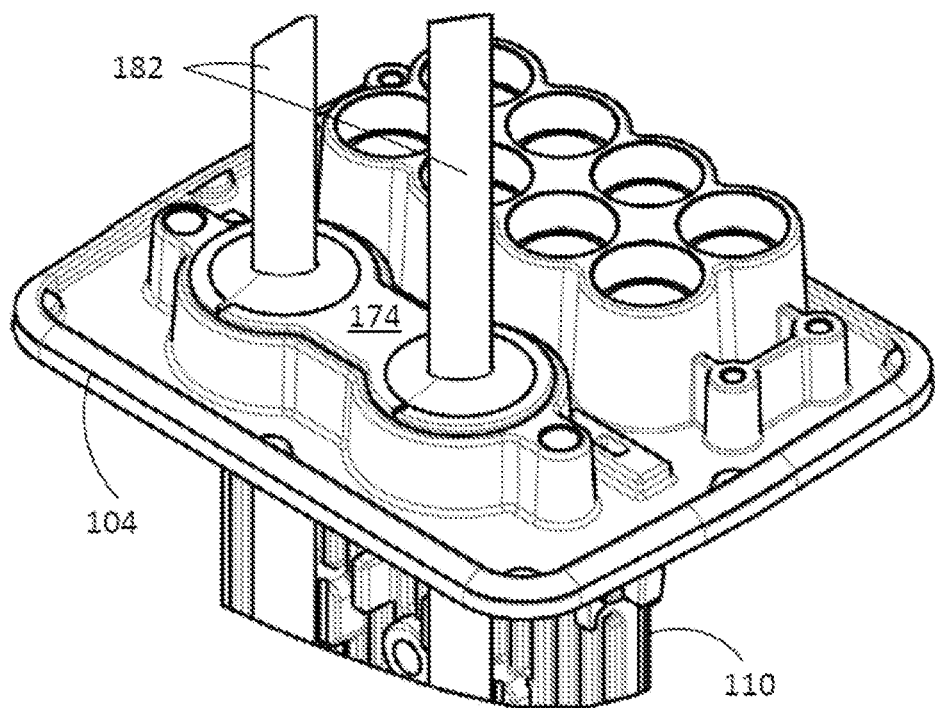

FIGS. 11A and 11B illustrate the sealing plug 174 being inserted into the faceplate 104 The slits 184 are created in the rounded end portions 176. In FIG. 11A, the cables 182 are inserted into the rounded end portions 176 via the slits 184. The sealing plug 174 is aligned with the opening for the input ports 106 and pressed firmly into the opening to seal the input ports 106. The sealing plug 174 may be formed form a resilient material, such as a sealing polymer, foam, etc. The sealing plug 174 may be sized to fit tightly in the opening of the input ports 106 in the faceplate 104, as shown in FIG. 11B.

Figure 11C:
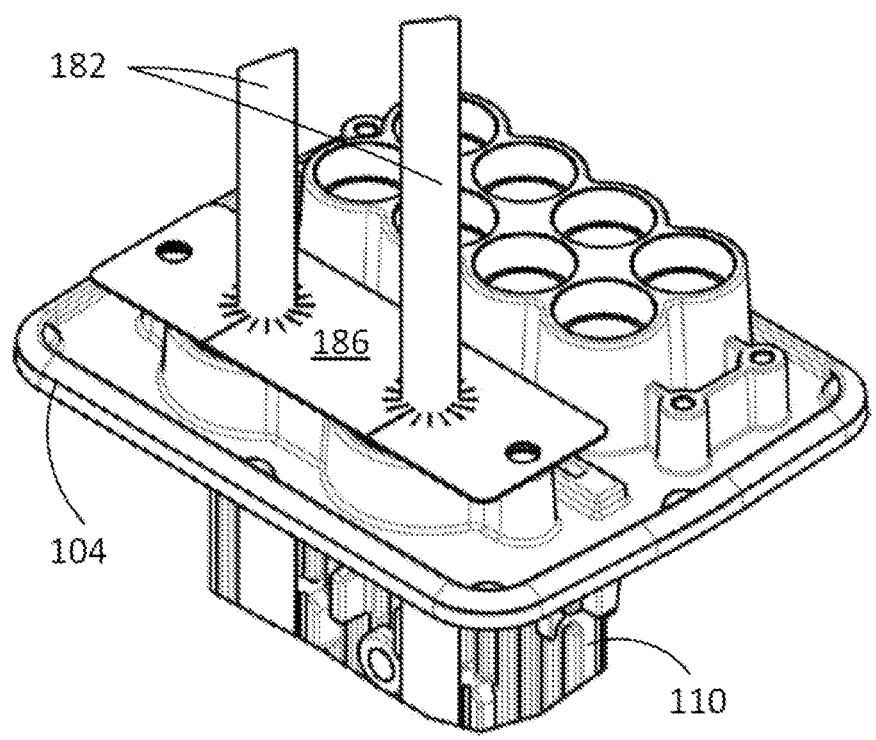
Figure 11D:
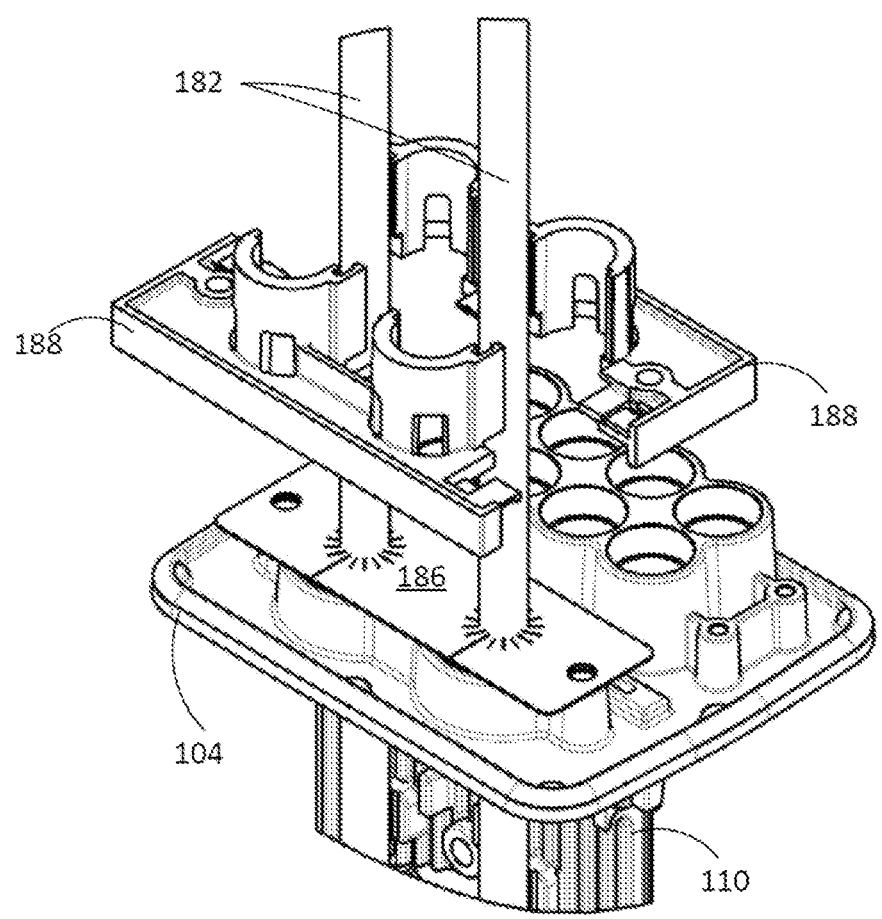
Figure 11E:
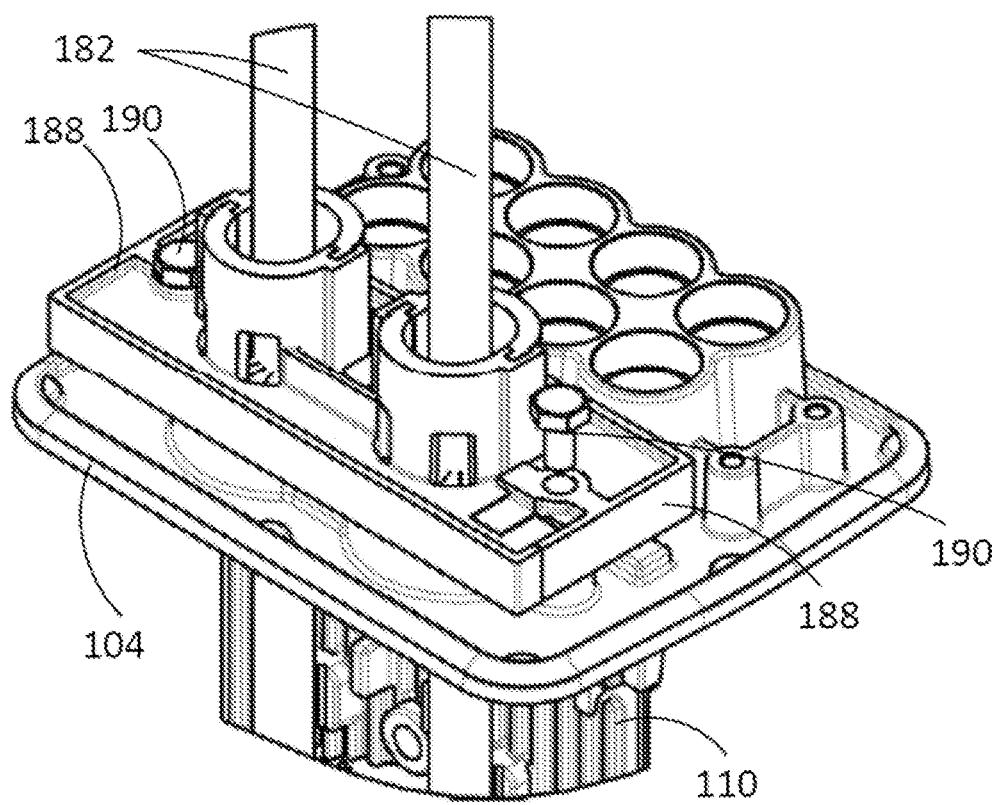
Figure 12:
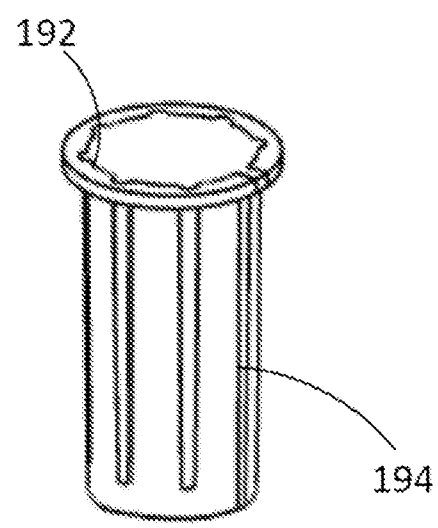
FIG. 12 is a perspective view of an adapter that may be used in conjunction with the sealing plug of FIG. 10.
Figure 13:
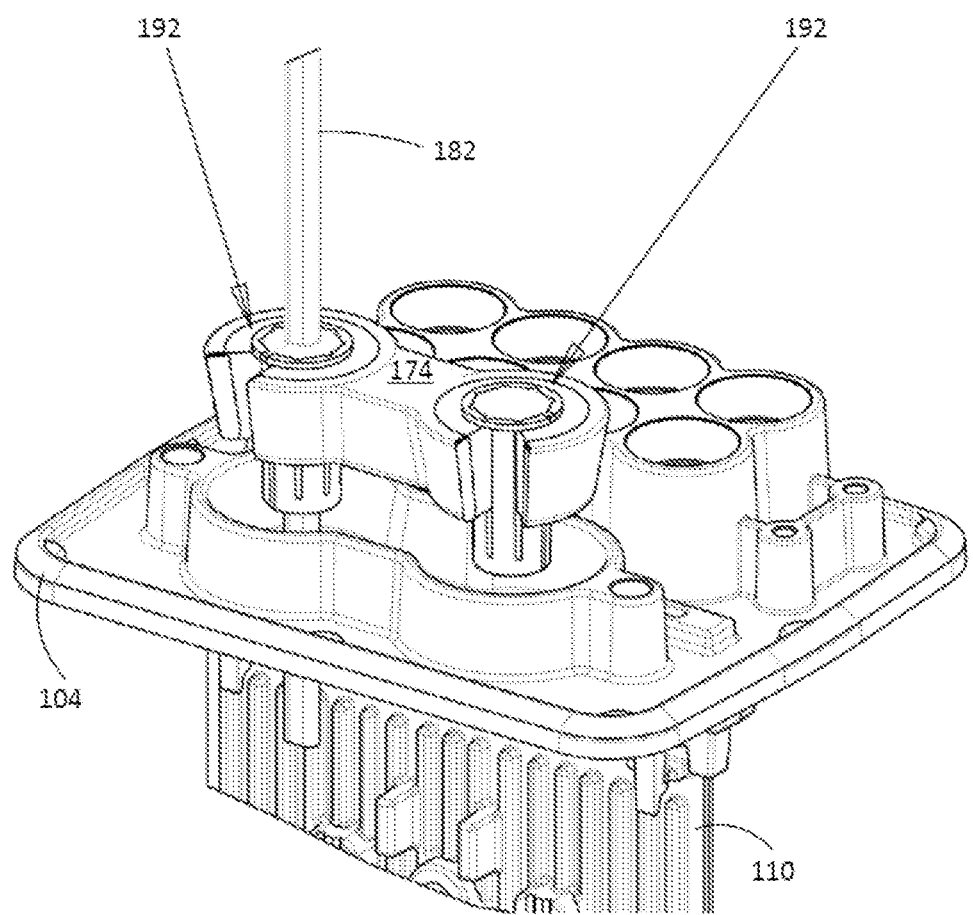
FIG. 13 is a perspective view of the adapter of FIG. 12 in use with the sealing plug and the faceplate.

FIGS. 11C, 11D, and 11E illustrate additional connection and sealing elements for use in conjunction with the cables 182 and sealing plug 174. FIG. 11C shows a film cover 186 placed over the cables 182 and on top of the sealing plug 174. A user may press down on the film cover 186 to further seat the sealing plug 174 into the opening in the faceplate 104 and around the cables 182. FIG. 11D illustrates a gasket cover plate 188 in two halves being placed around the cables 182 and clipped together, as shown in FIG. 11E. A user can press down firmly on the gasket cover plate 188 and tighten bolts 190 into the corresponding openings on the faceplate 104. The combined sealing assembly creates a secure and sealed connection for allowing the cables 104 to enter the terminal 100 via the input ports 106 of the faceplate 104. FIG. 12 shows, an adapter 192 that may be used in conjunction with the sealing plug 174 for accommodating smaller or thinner cables that are not sealed easily within the holes 180 of the sealing plug 174. A slit 194 may be formed in the adapter 192 for receiving the cable 182 and the adapter 192 may be snugly fit into the hole 180 in the sealing plug 174, as shown in FIG. 13.

Various embodiments of terminals disclosed herein are environmentally sealed terminals, thereby providing maximum reliability and durability in the harshest OSP environments.

This disclosure is not limited to the particular systems, devices and methods described, as these may vary. The terminology used in the description is for the purpose of describing the particular versions or embodiments only, and is not intended to limit the scope.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

The invention claimed is:

1. A sealed terminal, comprising:
    a housing comprising an interior compartment and a first perimeter flange defining an opening into the interior compartment;
    a splice tray positioned in the interior compartment and configured to support a module or a cartridge;
    a faceplate comprising a plurality of ports and a second perimeter flange extending at a perimeter edge of the faceplate;
    at least two L-shaped connection brackets including a slot configured for receiving the first perimeter flange and the second flange in an abutting position, wherein the at least two L-shaped connection brackets comprise angled bolt connections configured for adjustably joining ends of the at least two L-shaped connection brackets together; and
    a gasket positioned between the first perimeter flange and the second perimeter flange and configured to seal any gap therebetween.

2. The sealed terminal of claim 1, wherein the gasket is attached to a rear surface of the faceplate.

3. The sealed terminal of claim 2, wherein the gasket comprises a plurality of protrusions that are interference fit into a plurality of corresponding apertures in the rear surface of the faceplate.

4. The sealed terminal of claim 1, wherein the at least two connection brackets comprises a plurality of connection brackets connected to each other.

5. The sealed terminal of claim 4, wherein the plurality of connection brackets each comprises a slot for receiving the first perimeter flange and the second perimeter flange in the abutting position.

6. The sealed terminal of claim 1, wherein the first perimeter flange and the second perimeter flange each comprise an angled surface and the slot comprises mating angled sidewalls defining sides of the slot.

7. The sealed terminal of claim 1, wherein the gasket comprises a flat surface and an opposing beveled surface.

8. The sealed terminal of claim 7, wherein the gasket comprises a narrow end at the outer perimeter and a wide end at the inner perimeter.

9. The sealed terminal of claim 1, wherein the gasket comprises a stepped flange at the inner perimeter thereof.

10. The sealed terminal of claim 9, wherein the faceplate comprises a ridge that follows a path of the gasket, the ridge configured to mate with the stepped flange of the gasket.

11. The sealed terminal of claim 1, wherein the gasket comprises an S-shape configured to mate with the rear surface of the faceplate and a ridge on the rear surface of the faceplate.

\* \* \* \* \*